J. F. MERRILL.
FEED TROUGH.
APPLICATION FILED JAN. 16, 1908.
945,242.
Patented Jan. 4, 1910.
2 SHEETS—SHEET 1.
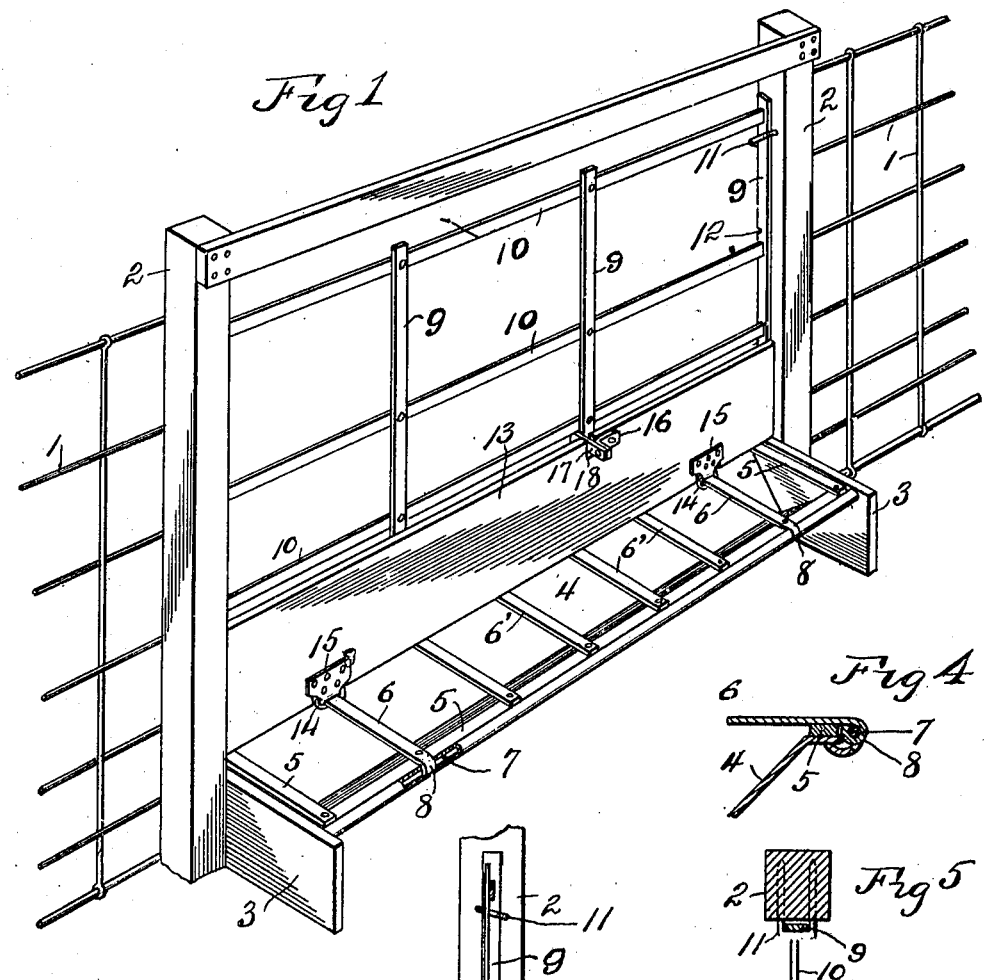
WITNESSES:
R. E. Hamilton.
E. B. House.
INVENTOR.
John F. Merrill
BY Warren D. House
His ATTORNEY.

J. F. MERRILL.
FEED TROUGH.
APPLICATION FILED JAN. 16, 1908.
945,242.
Patented Jan. 4, 1910.
2 SHEETS—SHEET 2.
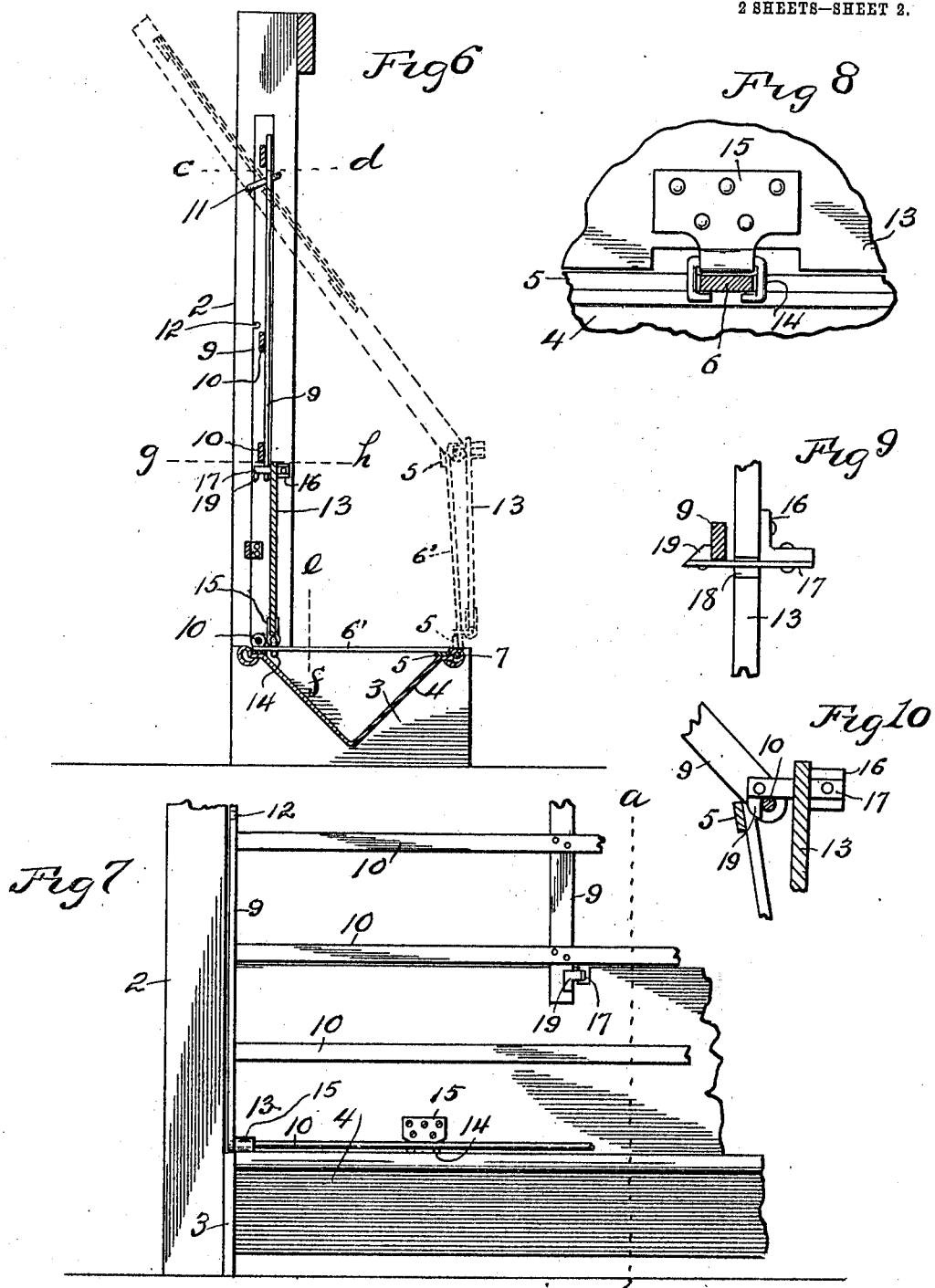
WITNESSES:
R. E. Hamilton
E. B. House
INVENTOR.
John F. Merrill
BY
Warren D. House
His ATTORNEY.

UNITED STATES PATENT OFFICE.

JOHN F. MERRILL, OF PAOLA, KANSAS.

FEED-TROUGH.

945,242. Specification of Letters Patent. Patented Jan. 4, 1910.

Application filed January 16, 1908. Serial No. 411,127.

*To all whom it may concern:*

Be it known that I, JOHN F. MERRILL, a citizen of the United States, residing at Paola, in the county of Miami and State of Kansas, have invented certain new and useful Improvements in Feed-Troughs, of which the following is a specification.

My invention relates to improvements in feed troughs. It is particularly adapted for use in feeding hogs.

The object of my invention is to provide means which will insure that each hog feeding at the trough shall secure his proper portion of the food.

Another object of the invention is to prevent the hogs from lying down in the trough.

A further object of my invention is to provide means by which the animals are held from access to the trough while food is being placed therein.

Other novel features of my invention are hereinafter fully described and claimed.

In the accompanying drawings which illustrate my invention—Figure 1 is a perspective view showing the movable fence section in the vertical position, the cover disposed vertically at the rear side of the trough, and the spacing bars disposed horizontally. Fig. 2 is a vertical section taken on the dotted line *a—b* of Fig. 7, looking in the direction indicated by the arrow, *y*. Fig. 3 is a vertical sectional view, showing the cover in the closed position. Fig. 4 is a vertical transverse sectional view through a portion of the trough and spacing frame. Fig. 5 is a horizontal section on the dotted line *c—d* of Fig. 6. Fig. 6 is a sectional view taken on the dotted line *a—b* of Fig. 7 in the direction denoted by the arrow *x*. Fig. 7 is a rear elevation of a portion of the mechanism. Fig. 8 is a vertical section taken on the dotted line *e—f* of Fig. 6. Fig. 9 is a horizontal section on the dotted line *g—h* of Fig. 6. Fig. 10 is an enlarged view of a portion of the spacing frame, cover and movable fence section, showing the parts in the positions represented in dotted lines in Fig. 6.

Similar characters of reference denote similar parts.

1 denotes an ordinary wire fence having two vertical posts 2 disposed at opposite ends 3, of a horizontal hog trough having between the ends 3 sides 4, inclining toward each other. A rectangular spacing frame is hinged to the forward side of the trough. Said frame is denoted by 5. The spacing frame is provided with a plurality of transverse spacing bars 6 and 6', the object of which is to keep the hogs from lying down in the trough and to enable each hog to have an opportunity to partake of the food in the trough. The trough is preferably made of galvanized sheet iron, the forward side of the body 4 being formed around a rod 7, secured at its ends to the ends 3 of the trough. The bars 6 have one set of ends formed into eyes 8, through which the rod 7 extends.

Intermediate the posts 2 is a movable fence section comprising preferably a rectangular frame having horizontal bars 10 and vertical bars 9. The two end bars 9 are pivotally and slidably mounted respectively in two guides comprising preferably two staples 11 secured to the posts 2. The bars 9 at the ends of the fence section are provided with notches 12 in their rear edges to receive the staples 11 when the fence section is swung to the position shown in dotted lines in Fig. 6. The rear edge of the spacing frame 5 is provided with loops which encircle the cylindrical lower bar 10 of the movable fence section.

13 denotes a flat plate or board which serves as a guard or cover for the open top of the trough. The cover 13 is slidably and pivotally connected to the frame 5 by means of two links 14 which respectively pivotally and slidably engage the two transverse bars 6 and are pivotally secured to two clips 15 which are secured to one longitudinal edge of the cover 13. The cover 13 is movable from the position shown in Fig. 3, in which it covers the top of the trough, to the two upright positions at opposite sides of the trough, represented in solid and in dotted lines in Fig. 6. To releasably hold the cover 13 in the vertical position at the rear side of the trough, as shown in solid lines in Fig. 6, the following described mechanism is provided:—

Secured to the forward side, adjacent the upper edge of the cover 13, as disposed in Figs. 1, 2, 6, 7 and 9, is a bracket 16, to which is secured rigidly the forward end of a horizontal spring plate 17, which extends rearwardly through a notch 18 in the upper edge of the cover 13, and has secured to one side adjacent its rear end, a vertical, downwardly extending lug 19, the rear edge of which is beveled, as shown in Fig. 9. The plate 17 is located in a position such that when the cover 13 is swung rearwardly at its upper edge, the lug 19 will be forced past and engage the rear side of one of the vertical bars 9 of the movable fence section, the plate 17 springing laterally sufficiently to permit this engagement of the said vertical bar 9 by the lug 19.

When the parts are positioned as shown in Figs. 1 and 6, with the cover 13 and movable fence section vertically disposed over the rear side of the trough and with the frame 5 in the horizontal position, the apparatus is in condition for the feeding of the hogs. The spacing devices or transverse bars 6 and 6', in this position prevent any of the hogs from lying down in the trough, and provide separate feeding spaces in the trough for the hogs.

If it is desired to close the top of the trough the spring plate 17 is sprung so as to release the lug 19 from engagement with the bar 9, after which the cover 13 is slid along the bars 6 to the position shown in Fig. 3.

If it is desired to place food in the trough from the rear side thereof and at the same time prevent interference with this operation by the hogs, the movable fence section is vertically slid and at the same time swung laterally within the staples 11 to the position shown in dotted lines in Fig. 6, in which position the staples 11 will enter the notches 12 in the end bars 9 of the movable fence section, thereby retaining the fence section in the inclined position to which it has been adjusted. When the fence section has been moved to the position just described the spacing frame 5 and the guard or cover 13 will be swung to the upright position shown in dotted lines in Fig. 6. When in this position the guard or cover 13 will be retained in position by the plate 17 and lug 19, engaging respectively the upper and rear sides of the lower bar 10, of the movable fence section. The guard or cover 13 in this position will prevent the hogs having access through the spacing frame 5 to the trough. At the same time a large open space between the posts 2 will be provided, thereby permitting free insertion of food into the trough from the rear side of the fence and trough.

To replace the parts in the positions for feeding, as shown in Fig. 1, it is but necessary to raise the end bars of the movable fence section so as to disengage the staples 11 from the notches 12 in said bars, after which the lower end of the fence section is swung rearwardly, together with the spacing frame 5 and guard or cover 13, until the parts are again in the position shown in Fig. 3. The cover 13 is then swung upward at its rear edge and slid rearward upon the bars 6, until it is in the position shown in Fig. 6.

My invention may be modified, within the scope of the appended claims, without departing from its spirit.

Having thus described my invention, what I claim and desire to secure by Letters Patent, is:—

1. The combination with a feed trough having an open top, of two vertical posts disposed at opposite ends of the trough, a frame having transverse spacing bars adapted to extend across the top of the trough, the frame being hinged to one side of the trough and movable from a horizontal to an upright position, and a movable fence section hinged at its lower end to said frame and pivotally and slidably connected to said posts.

2. The combination with a feed trough having an open top, of a spacing frame hinged to the forward side of said trough, two vertical posts disposed at opposite ends of said trough, a movable fence section hinged to said spacing frame and movable between said posts to and from a vertical position above the rear side of the trough, and a cover for the top of the trough movable with the spacing frame to and from a position covering said trough.

3. The combination with a feed trough having an open top, of a spacing frame hinged to the forward side of the trough, two vertical posts at opposite ends of the trough, a movable fence section hinged to said spacing frame and pivotally and slidably engaging said posts so as to be moved to and from a vertical position above the rear side of the trough, and a cover movable with the spacing frame to and from a position covering said trough.

4. The combination with a feed trough having an open top, of two vertical posts disposed at opposite ends of said trough and provided with guides, a movable fence section vertically slidable and pivotally mounted in said guides and having notches to receive said guides so as to support the section in an elevated position, a spacing frame hinged at one edge to the forward side of said trough and hinged at its opposite edge to the lower end of said fence section, said spacing frame being disposed horizontally across the top of the trough when the fence section is vertically disposed, and a cover supported by the frame and movable from a position covering the top of said trough to upright positions at opposite sides of the trough.

5. The combination with a feed trough, of two vertical posts disposed at opposite ends of the trough, a laterally swinging fence section intermediate said posts and movable to and from a vertical position adjacent the rear side of the trough, transverse spacing devices hinged to said fence section and to the forward side of said trough, and a cover slidably connected to the spacing devices and movable to and from a position covering said trough when the spacing devices are horizontally disposed.

6. The combination with a feed trough, of two vertical posts disposed at opposite ends and adjacent to the rear side of said trough, a laterally movable fence section normally supported in a vertical position between said posts and above the rear side of said trough, transverse spacing bars hinged to the forward side of said trough and hinged to said fence section, and a cover slidably engaging said transverse bars and when the transverse bars are horizontally disposed movable thereon from a position covering said trough to upwardly extending positions at opposite sides of said trough.

7. The combination with a feed trough, of two vertical posts disposed at opposite ends of the trough, a movable fence section having two vertical end bars provided each in its rear edge with a notch, two staples secured respectively to said posts and respectively embracing said end bars and adapted to enter said notches so as to support the fence section when the same is elevated and swung to an inclined position, transverse spacing bars hinged to said fence section and to the forward side of said trough, and a guard slidable lengthwise of said bars and extending transversely across said spacing bars when said bars have been swung to an upright position, said guard serving as a cover for the trough when the spacing bars are swung to positions extending across said trough, said guard when the transverse bars are disposed horizontally being movable on said transverse bars to a vertical position adjacent the rear side of the trough.

8. The combination with a feed trough, of two vertical posts disposed at opposite ends thereof and provided with guides, a fence section slidably and pivotally engaging said guides and movable laterally from a vertical position adjacent the rear side of said trough, transverse spacing bars hinged to the forward side of said trough and hinged to the lower end of said fence section, and a cover pivotally and slidably engaging said spacing bars and when the spacing bars are horizontally disposed movable thereon from a position covering said trough to upwardly extending positions at opposite sides of said trough.

In testimony whereof I have signed my name to this specification in presence of two subscribing witnesses.

JOHN F. MERRILL.

Witnesses:
CHAS. G. GARTNER,
J. F. DONAHOE.